United States Patent
Frenkil

(10) Patent No.: US 6,807,660 B1
(45) Date of Patent: Oct. 19, 2004

(54) VECTORLESS INSTANTANEOUS CURRENT ESTIMATION

(75) Inventor: Gerald L. Frenkil, Concord, MA (US)

(73) Assignee: Sequence Design, Inc., Santa Clara, CA (US)

( * ) Notice: Subject to any disclaimer, the term of this patent is extended or adjusted under 35 U.S.C. 154(b) by 44 days.

(21) Appl. No.: 10/262,914

(22) Filed: Oct. 1, 2002

(51) Int. Cl.$^7$ ................................................ G06F 17/50
(52) U.S. Cl. ....................................................... 716/6; 4/5
(58) Field of Search ...................... 716/4–6; 702/70–77; 327/105–106, 114

(56) References Cited

U.S. PATENT DOCUMENTS

| | | | | |
|---|---|---|---|---|
| 6,499,129 | B1 * | 12/2002 | Srinivasan et al. ............. | 716/4 |
| 6,557,145 | B2 * | 4/2003 | Boyle et al. .................... | 716/2 |
| 2001/0010090 | A1 * | 7/2001 | Boyle et al. .................... | 716/2 |
| 2002/0045995 | A1 * | 4/2002 | Shimazaki et al. ............ | 702/77 |
| 2002/0147555 | A1 * | 10/2002 | Nagata et al. ................. | 702/70 |
| 2002/0190760 | A1 * | 12/2002 | Carley .......................... | 327/105 |

OTHER PUBLICATIONS

Zhao, S. et al., "Frequency domain analysis of switching noise on power supply network", Computer Aided Design, 2000. ICCAD 2000. IEEE/ACM International Confeence on, Nov. 5–9. 2000 pp.: 487–492.*

Chen, H.H. et al., "Interconnect and circuit modeling techniques for full–chip power supply noise analysis", Components, Packaging, and Manufacturing Technology, Part B: Advanced Packaging, IEEE vol. 21, Issue: 3, Aug. 1998 pp.: 209–215.*

* cited by examiner

Primary Examiner—Vuthe Siek
Assistant Examiner—Naum Levin
(74) Attorney, Agent, or Firm—Edward C. Kwok; MacPherson Kwok Chen & Heid LLP

(57) ABSTRACT

A current waveform for an electronic circuit is calculated from a description of the circuit at a given level of abstraction without requiring a detailed simulation. In one embodiment, the waveform is estimated without using test vectors, and uses an analysis time step or "granularity" that is much shorter than a clock cycle. The method is applicable for calculating worst-case instantaneous current.

11 Claims, 4 Drawing Sheets

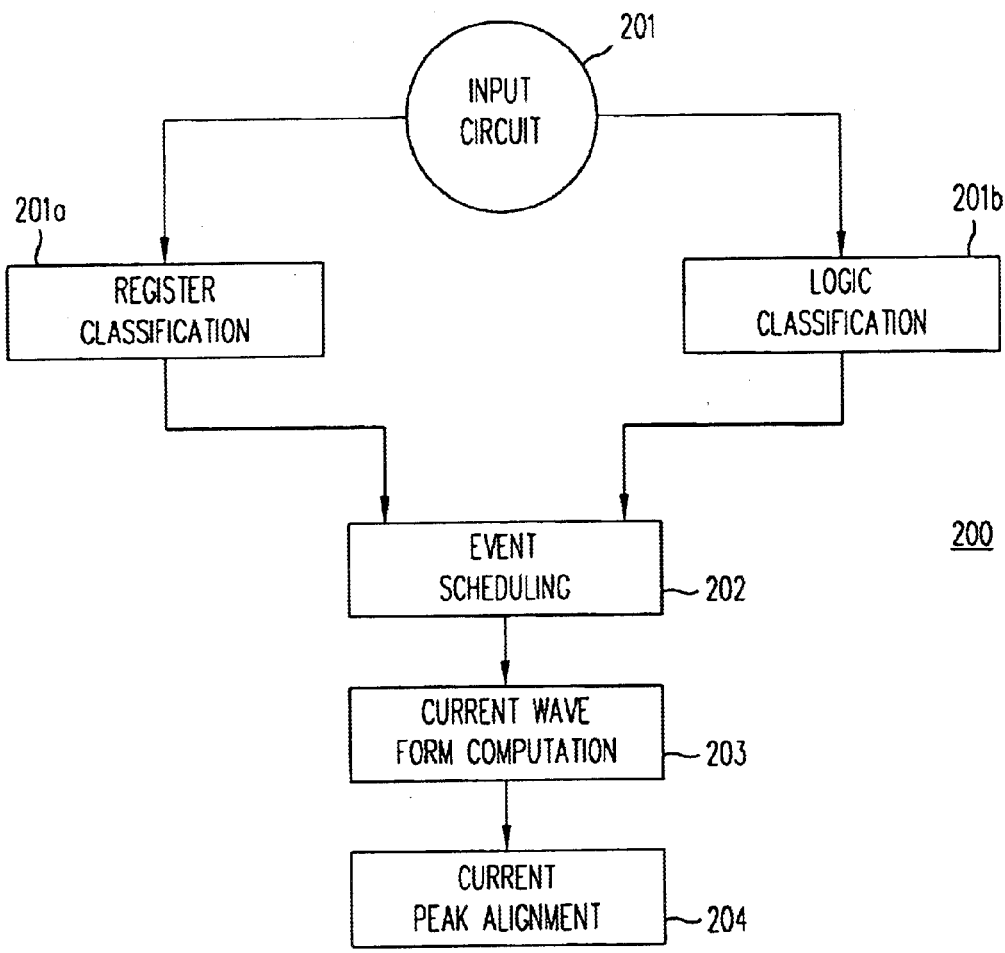
FIG. 2
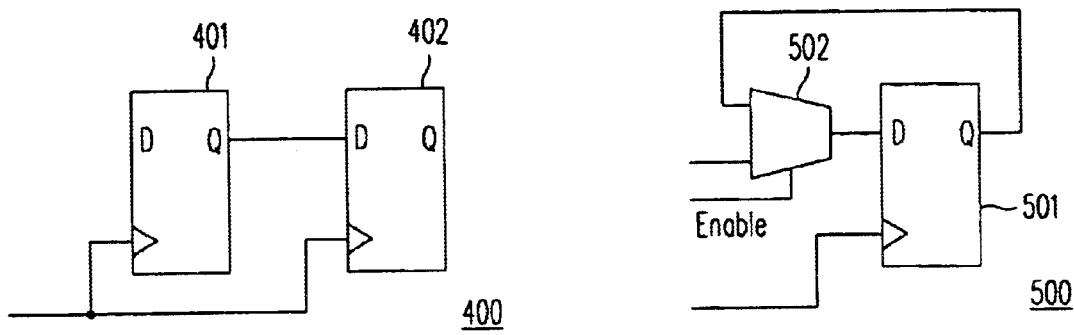
FIG. 4
FIG. 5

```
For each clock domain Begin
    For each clock edge (rising, falling) Begin
       ⎧  Set Root_Reclassification_point = lowest level registers in levelized netlist  ⎫
602⎨  Reclassify                    // global reclassification                            ⎬
       ⎩  Save classifications          // global maximum switching count                 ⎭
         For each group (row, module) Begin                                                     601
              Set Root_Reclassification_point = selected group
603 ⎨         Reclassify              // local reclassification
              Save classifications    // local maximum switching count
         End group classifications
    End clock edge
    The classification with most regs switching 0-1 will be used to compute Idd
    The classification with most regs switching 1-0 will be used to compute Iss
    Compute current waveforms
End clock domain
                                                                       600
```

FIG. 6

```
Reclassify Begin
    Classify each register as output switching 0-1
    For each register at a given level, from lowest level to highest level
         Reclassify to output switching 1-0 if data inversion not present
    For each register at a given level, from lowest level to highest level
         Reclassify to no change on output as dictated by multiplexing logic
    Classify logic
    Save classifications
    Repeat for each register output switching 1-0
    Save classifications
End Reclassify
```

FIG. 7

VECTORLESS INSTANTANEOUS CURRENT ESTIMATION

BACKGROUND OF THE INVENTION

1. Field of the Invention

The present invention relates to electronic design automation (EDA) for integrated circuits. In particular, the present invention relates to an EDA tool for estimation of currents or voltages based on a circuit description of a given level of abstraction.

2. Description of the Related Art

Current flow characteristics are important design considerations in an integrated circuit (IC). Thus, the ability to accurately estimate current flow characteristics is very valuable. During the design phase, several current measuring types are typically applied. These measuring types include, for example:

Average Current—typically used to determine operating temperatures and battery life; average current is typically measured over a relatively long time period, such as over tens, hundreds or thousands of clock cycles.

RMS Current—typically used for estimating long term reliability effects (e.g., electromigration); RMS current, like average current, is typically measured over a relatively long time period, such as tens, hundreds or thousands of clock cycles.

Peak Sustained Current—measures the maximum average current sustained over a period of time (e.g., hundreds or thousands of clock cycles).

Instantaneous Current—typically used to determine the maximum voltage excursions on power supply lines; instantaneous current refers to a current drawn over a short time interval (e.g., a time interval that is equal to or less than the smallest signal transition duration).

Worst Case Instantaneous Current—measures the maximum instantaneous current that can flow at any given time.

While numerous methods exist for measuring the current flow characteristics of a fabricated integrated circuit, few predictive methods are available to be used during the design phase. The paucity of predictive methods is partly due to the size of the data set required for accurate calculations.

Existing methods for current calculations can be classified according to design abstraction level, calculation method, and measurement type. The abstraction levels at which these calculations are performed are transistor level, logic or gate level, and register-transfer level (RTL). The calculation methods are dynamic and vectorless. Dynamic methods utilize, for example, time- or cycle-based simulators to generate representative activities in the circuit, which can then be used for power or current calculations. In contrast, vectorless methods (also known as static methods) may utilize, for example, probabilistic methods to calculate expected values of power or current. The current measurement types include average current, peak sustained current, and instantaneous current, which are already briefly described above.

Both static and dynamic methods are applicable at the transistor level, and all current measurement types can be estimated at the transistor level. However, not all current measurement types can be estimated in practice using static and dynamic methods. On one hand, due to the computational complexity resulting from the size of state-of-the-art integrated circuits, dynamic methods have become impractical. On the other hand, existing vectorless methods grossly over-estimate, resulting in unrealistic worst case results. For these and other reasons, transistor level methods are not effectively or efficiently used for estimation on an entire integrated circuit.

As in the transistor level, both static and dynamic methods are applicable at the logic or gate level, and all current measurement types can be estimated at the gate level. At the gate level also, not all current measurement types can be estimated in practice using static and dynamic methods. While the circuit at the gate level contains less circuit elements than the corresponding circuit at the transistor level, the computational complexity still renders dynamic methods impractical. Similarly, vectorless methods at the gate level also suffer the same deficiencies as vectorless methods at the transistor level.

At the RTL, as at the transistor level and the gate level, both static and dynamic techniques are available and all current measurement types can be estimated. At the RTL, in practice, accurate dynamic simulations are possible for estimating some current measurement types (e.g., average current), but not for other current measurement types (e.g., instantaneous current). Vectorless methods at the RTL also suffer the same deficiencies as its counterparts at the transistor and the logic gate levels.

In a power grid analysis of an integrated circuit, an estimation of worst-case instantaneous power (or, more specifically, instantaneous current flow) is desirable. In the prior art, however, most power tools can calculate only an average power consumption or an average current flow. An instantaneous current is determined from circuit elements that switch at the instant the current is measured, while average power (hence, average current) is determined from all elements that switch in aggregate over some period of time. Typically, an average current aggregates over a lengthy period of time (e.g., over a few milliseconds to a few seconds). A worst-case instantaneous current for a given simulation or stimulus, however, is determined by taking the maximum current flowing at any point in time over the length of a particular simulation vector set. The calculation of this value is straightforward (i.e., $I_{dd}=\text{Max}(I_{timestep\_n})$ over all timesteps). However, this worst-case instantaneous current is not necessarily the actual worst case because the simulation vector set may not have exercised the worst-case situation.

In integrated circuit design, the term "worst case" refers to the worst operating condition for the integrated circuit that can arise. For example, a worst-case peak instantaneous current for a given circuit may be 1 ampere. Often, however, this worst-case condition may not be known until after the integrated circuit is fabricated. Thus, an ability to estimate this peak instantaneous value prior to committing the integrated circuit to silicon is of great importance. However, different estimation methods can yield different values for the estimated worse case. One technique may estimate the worst case current to be 1.2 amperes while another method estimates it to be 3 amperes. Clearly, even though both estimates are "worst-case" estimates, there are differences in accuracy and efficacy. It would be valuable to be able to classify the 3-ampere estimate as an "Overly Conservative Worst Case" estimate, if the value is so far beyond the actual worst case as to be unrealistic (hence, of little or no value), and to be able to classify the 1.2-ampere estimate as a "Reasonable Worst Case" estimate, if the estimate is a reasonable approximation to the actual worst case.

SUMMARY OF THE INVENTION

The present invention provides an integrated circuit (IC) power analysis tool, which receives an integrated circuit represented at a given level of abstraction, such as the register-transfer level (RTL), the gate level or the transistor level, to accurately calculate the worst-case instantaneous current waveform of an IC using a vectorless technique. The present invention allows a current waveform to be accurately estimated (relative to an actual worst-case current) without requiring an extensive dynamic simulation of the circuit.

In one embodiment, the shape of the current waveform, a peak value of the current waveform, and a maximum value of the derivative of the current waveform with respect to time can be estimated. A method according to the present invention takes advantage of the facts: (a) a clock edge generates significant signal activity, and hence a large number of current-consuming events, and (b) the transitions of clock signals are necessarily highly correlated to worst-case current consumption.

According to one embodiment of the present invention, a device under test (DUT) is pre-conditioned to a state such that when a clock signal transitions, the resulting switching in the combinational logic produce a worst-case current waveform for the device. In that embodiment, a schedule of the state changes resulting from the clock edge is estimated. The schedule represents a sequence of current-consuming events—each cell in the device has associated with it a start time, an end time, and a current waveform. The start and end time times represent when the current-consuming event begins and ends, and the estimated current waveform between these times represents the estimated current for the cell during the current-consuming event. The current waveform estimate is based on information from a static timing analysis (STA) and each individual cell's timing and power models. The STA timing information indicates when nodes in each cell would switch. The power model defines power events during which nodes in the cell would switch, and the current associated with each event.

For instantaneous current calculations, a worst-case peak of the current waveform is determined primarily from the activity in the clock network and the activity in all the storage elements.

The present invention provides a much higher accuracy over methods in the prior art.

A method of the present invention reliably estimates worst-case instantaneous current to correctly validate power grids even in circuits with large peak currents and small noise margins typical of high power consumption, low supply voltage integrated circuits. The worst-case instantaneous current estimate is accomplished without using simulation at the gate level as a source of activity data.

The present invention is better understood upon consideration of the detailed description below and the accompanying drawings.

BRIEF DESCRIPTION OF THE DRAWINGS

FIG. 2 illustrates generally a method for vectorless calculation of instantaneous currents, in accordance with one embodiment of the present invention.

FIG. 4 illustrates circuit 400 having registers 401 and 402 that cannot switch in the same direction in response to a clock transition.

FIG. 5 shows circuit 500, which is another example in which a register can be reclassified.

FIG. 6 shows method 600 (presented in pseudo-code form) for reclassifying registers, in accordance with one embodiment of the present invention.

FIG. 7 shows method 700 for reclassifying registers based, for example, on circuit topology and identified or imposed circuit states.

DETAILED DESCRIPTION OF THE PREFERRED EMBODIMENTS

The present invention provides a vectorless instantaneous current estimation capability at the gate level or at the transistor level that does not require the design to be simulated, and calculates an actual worst-case or reasonable worst-case value for instantaneous current by determining each register's response to a clock edge under worst-case switching conditions.

Figure 1:
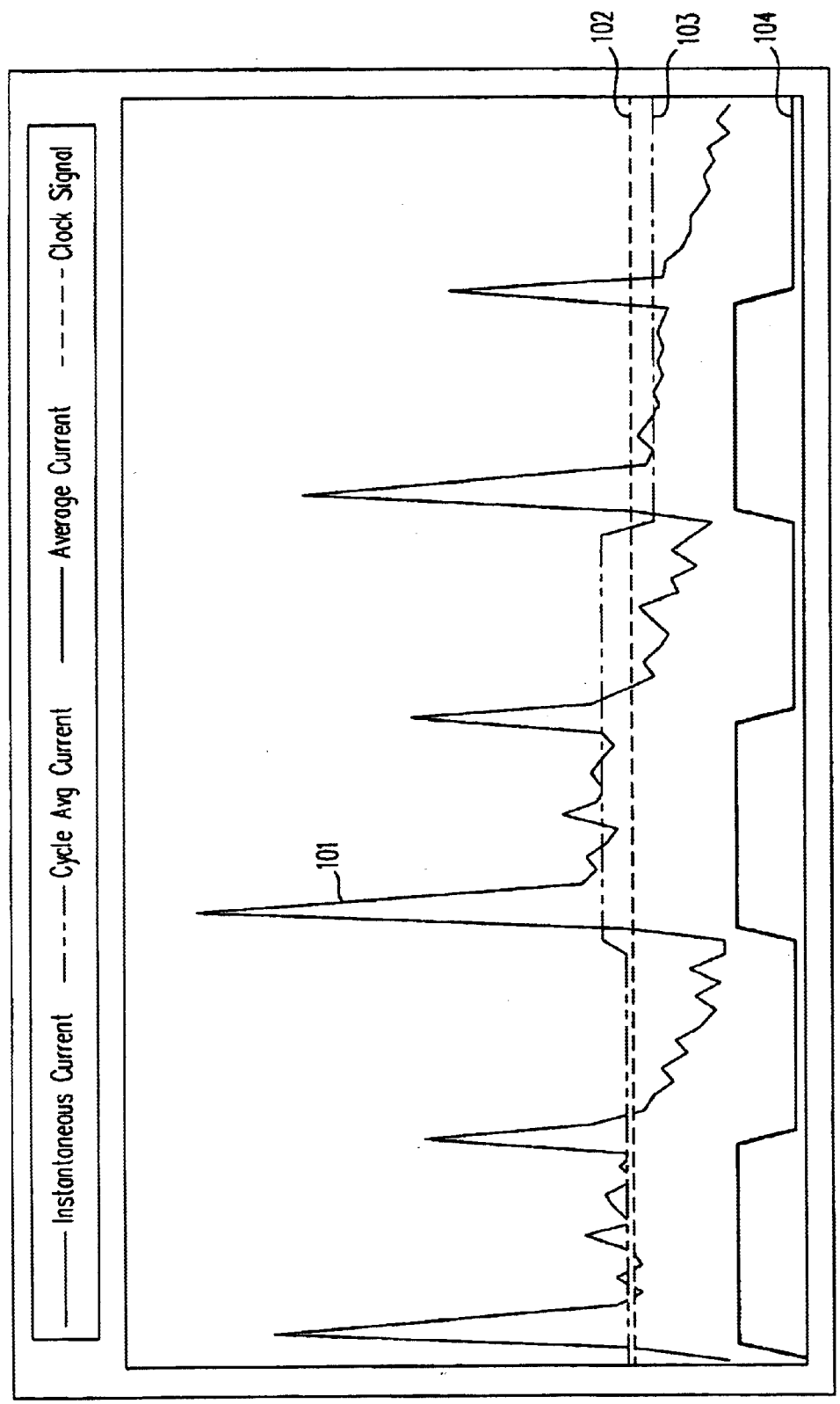
FIG. 1 shows selected current waveforms derived from a typical operation of an integrated circuit.

FIG. 1 shows selected current waveforms derived from a typical operation of an integrated circuit. FIG. 1 shows instantaneous current waveform 101 occurring over 3 cycles or periods of clock signal 104. Waveforms 103 and 104 are, respectively, the per-cycle average current and the average current over the three periods of clock signal 104 derived from instantaneous current waveform 101.

FIG. 2 illustrates generally a method for vectorless calculation of instantaneous currents, in accordance with the present invention. As shown in FIG. 2, step 201 receives an input logic circuit and performs register classification steps 201a and logic classification step 201b. Register classification step 201a classifies each register according to the register's response to a rising or falling edge of an associated "root" clock signal. Logic classification step 201b classifies each combinatorial logic cell according to the logic cell's response to a logic transition on one or more of its input terminals. Event scheduling step 202 then schedules each logic cell a time point ("arrival time"), relative to a relevant edge of its associated root clock signal, at which the logic cell is expected to have a signal transition. The total schedule ("event log") is then used, at current waveform computation step 203, to aggregate the currents of all registers and logic cells associated with each root clock signal to provide a current waveform representing the instantaneous "peak" current for the root clock domain. The instantaneous peak current represents a reasonable worst-case current waveform. Finally, at current peak alignment step 204, the instantaneous peak currents from each clock domain are aligned with each other so as to create a multi-clock domain instantaneous peak current. This technique is particularly advantageous when some or all of the clock domains are asynchronous to each other.

Event scheduling step 202 and current waveform computation step 203 can be provided using conventional static timing analysis (STA) techniques. Current peak alignment step 204 shifts the time of all events for all secondary clocks such that their instantaneous peak currents align with the instantaneous peak current of the primary clock. (A primary clock is a clock signal selected by the user as a time domain reference for all other clocks, which are referred to as secondary clocks). The shifting in time of the events can be implemented by changing the initial arrival time of each event at a root clock node. A root clock node is a point in the circuit at which the root clock signal is inserted into the circuit. The arrival times of all other downstream events are relative to a root clock node transition.

Figure 3:
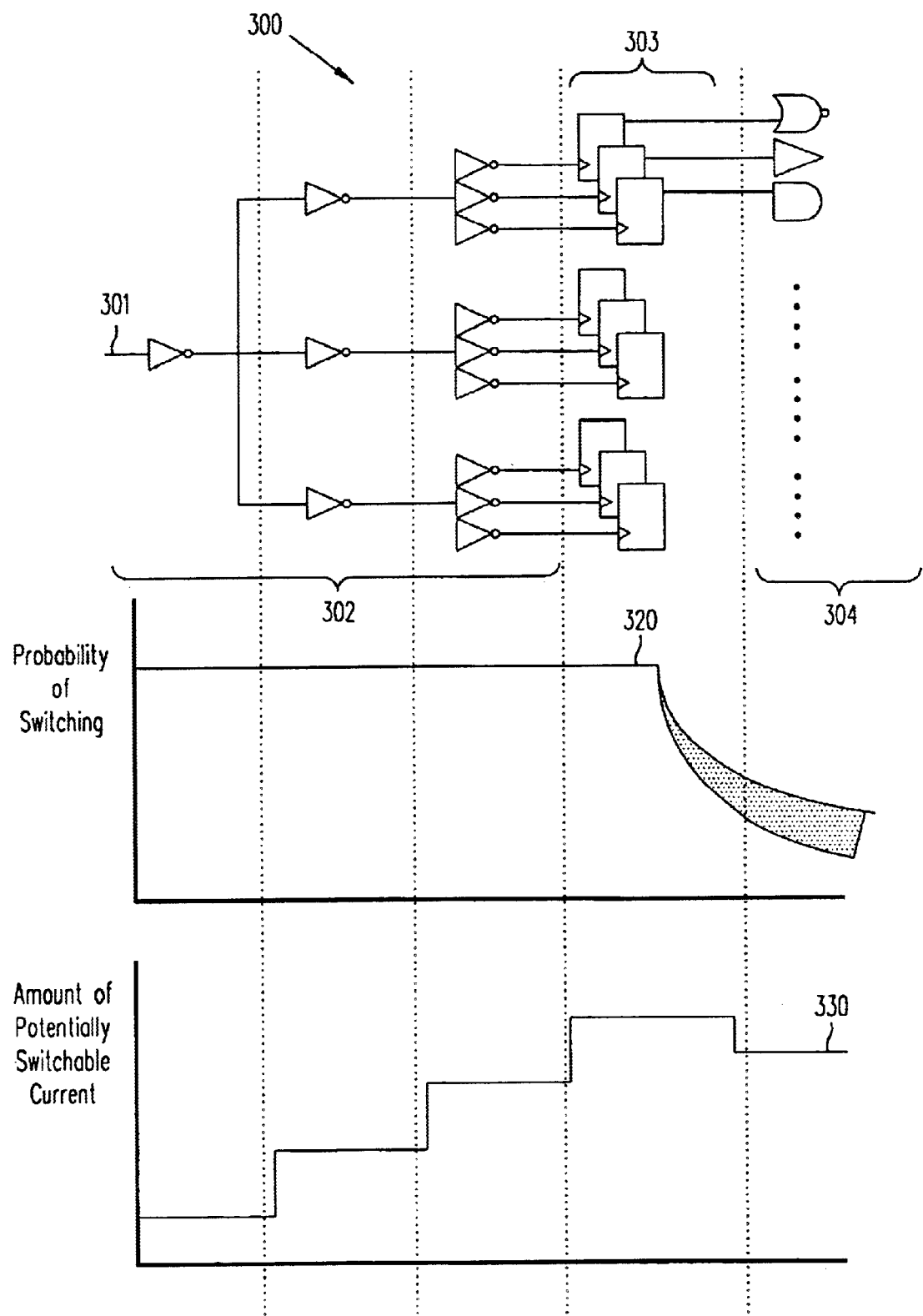
FIG. 3 illustrates observations that allow vectorless worst-case instantaneous current estimation to be performed, in accordance with one embodiment of the present invention.

The present invention achieves vectorless worst-case instantaneous current estimation based on the following observations regarding dynamic current flow. These observations are illustrated in conjunction with FIG. 3. In FIG. 3, logic circuit 300 associated with the clock domain of the root clock signal at terminal 301 is "levelized" for illustrative purpose. As is typical of many logic circuits, two or more levels of inverting buffers 302 ("clock tree") buffer the root clock signal at terminal 301 before the clock signal is distributed to clock registers 303. The data output values of registers 303 are input to combinational logic circuit 304. Corresponding to each circuit level, the probability of a switching for elements in the circuit level and the expected current in the current level are plotted in graphs 320 and 330, respectively.

First, it is observed that the highest peak of a current waveform occurs immediately after a clock signal transition. This highest peak results from the near-simultaneous switching of all the buffers in the clock tree (i.e., buffers 302), the local clock buffering within each of register 303, and registers 303 themselves. As shown in FIG. 3, the probability of a node in the clock tree switching is equal to 1. Thus, a clock network, such as the clock network of buffers 302, can be accurately analyzed for power consumption in a vectorless manner (i.e., without a simulation, such as an event driven simulation, of gate or transistor level activity). Such analysis is possible because no state information is typically necessary to propagate signal transitions through buffers and inverters. (One possible exception is gated clock signals, which require some state information to properly analyze).

To achieve the current waveforms for registers, a heuristic can be used that assumes initially that each registered element changes state at a transition of the clock signal it receives. Based on this initial assumption, the list of registers that can change state together is culled using one or more classification algorithms that determine a register's response to a particular edge of an associated clock signal. As explained in further detail below, these classification algorithms search for logical conditions and topologies that would prevent certain registers from switching at the same time as others.

Second, as shown in graph 330 of FIG. 3, it is observed that the probability of a node following a registered element switching is less than 1. In fact, the amount of potentially switching current is high at logic cells receiving data values from registers directly from registers 303 and is likely to decrease at successive levels of logic cells. This high confidence in predicting switching in logic cells that contain the largest amount of potentially switchable current enables us to confidently predict the peak currents resulting from a clock event.

Conventional static timing analysis can determine to an acceptable precision the times at which buffers, registers or logic cells transition. (Lesser peaks, of course, may occur subsequent to this highest peak between clock signal transitions. However, such lesser peaks are of less significance in the worst-case instantaneous current analysis.)

To allow register classification, each register is associated with parameters that specify (1) its clock domain, (2) its clock sense (i.e., a rising edge, a falling edge, or indeterminate) with respect to the root clock, (3) its data sense (i.e., true, false, or indeterminate) with respect to an upstream register, and (4) its enable sense (true, false, or unknown), when a data enable signal is received. Each register may be classified according to how their data input and clock input terminals are configured. In one embodiment of the present invention, each register is classified according to one of the following expected responses:

(a) clock rises, output changes 0→1;
(b) clock rises, output changes 1→0;
(c) clock rises, no change on output;
(d) clock falls, output changes 1→0;
(e) clock falls, output changes 0→1;
(f) clock falls, no change on output; and
(g) no clock received Initially, all registers are classified as having their output values change 0→1 when a rising clock edge is received. A register is reclassified if it is determined that its assigned response would not occur. For example, a register is reclassified when there is no logic inversion in the data path from the registers immediately upstream. The absence of a logic inversion ensures that two "back-to-back", or cascaded, registers cannot switch simultaneously in the same direction. FIG. 4 illustrates such a configuration in circuit 400. Consequently, the downstream register is reclassified to change output state from 1→0 at the rising clock edge. In registers with both inverting and non-inverting paths feeding their D inputs, no reclassification due to logic inversion considerations is performed. An example of such a configuration is shown in FIG. 4.

Circuit 500 of FIG. 5 illustrates another example in which a register can be reclassified. As shown in FIG. 5, register 501 receives at its D input terminal an output value of multiplexor 502, thus forming a recirculating data path. Whether or not register 501 changes state in this configuration in response to a clock signal transition depends on the logic value at multiplexor 502's select line, which can be determined by propagating forward an initial state of each upstream register's output value through the intervening combinatorial logic circuit. If register 501 is found to be inhibited from changing states due to the recirculating data, register 501 is reclassified to have the response "clock rises (or falls), no output change."

As another example, a register can be reclassified if the clock path to the register's clock input includes a gating element (i.e., the register is clocked by a gated clock signal). If the register is clocked by a gated clock signal, the state of the gating element (enabled or disabled) can be determined by forward propagating the initial state of the output value at each register upstream to the gating element, as described above with respect to multiplexors. The test to determine whether or not the register should be reclassified can be complex, as conditions may exist in which all gating elements are enabled. Such a condition can be identified either automatically or by the user. In one embodiment, the default condition assumes all clock gating elements to be enabled.

Other reclassification conditions can be identified, upon further detailed analysis of the logic circuit between registers.

FIG. 6 shows method 600 (presented in pseudo-code form) for reclassifying registers, in accordance with the present invention. As shown in FIG. 6, method 600 is iterated for each clock domain and each clock edge transition (i.e., 0→1 and 1→0 transitions). At iteration 601, register reclassification begins from a reclassification root point. In this embodiment, two reclassification phases 602 and 603 are shown, although any number of phases can be provided within the scope of the present invention. As shown in FIG. 6, reclassification phase 602 sets the root points to be the lowest level registers in a levelized netlist. From each root point, reclassification traverses forward through the netlist until all registers are considered. Reclassification phase 601 considers the maximum instantaneous current of the circuit as a whole.

Reclassification phase 603 traverses over the netlist again, using a different, physically oriented reclassification root point. Reclassification phase 603 allows maximum instantaneous currents to be calculated subsequently for a group of physically related logic cells, such as logic cells on a given row or in a given module. Thus, in reclassification phase 603, the registers on a given row of cells are used as the starting points for reclassification, rather than the lowest level registers, as used in reclassification phase 602. During reclassification phase 603, all downstream registers to the registers at the root points are reclassified, but not registers upstream to the root points. Reclassification phase 603 is repeated once for each row or module until the entire netlist is traversed.

As described above, within each of reclassification phases 602 and 603, the reclassification schemes based on circuit topology and identified or imposed circuit states can be carried out, for example. FIG. 7 shows such a method 700, also presented in pseudo-code form. Concurrently, combinatorial logic elements are classified, based on the state of their input values, which are driven by the register output values determined from the previous steps.

Upon completion of reclassification phases 602 and 603, data is available for estimating both the worst-case instantaneous current for the entire netlist and the worst-case instantaneous current for each row or module individually. Reclassification phase 603 enables worst-case instantaneous currents to be estimated at different levels of granularity (i.e., entire design, single module, or single row) within the context of the entire design. This granularity level can be specified by default (e.g., per row or per module or per power/ground segment), or by the user.

Genetic algorithms can be used to implement method 600.

In one embodiment of the present invention, a user interface is provided that allows a user to specify the states of internal, input and output control signals in an expected worst-case condition for a circuit to be analyzed. Input and output control signals include reset and JTAG control signals, for example. (JTAG, which stands for "Joint Test Action Group", is the name referred by the industry for the IEEE 1149.1 Standard for Test Access Port and Boundary-Scan Architecture.) Examples of internal control signals include register enable signals and clock gating control signals. In addition, the user can specify operational values pertaining to each clock signal (e.g., clock period, duty cycle, phase relationship with respect to any other clock signal). The user can also specify the states of selected registers. The states can be specified completely (e.g., as scan test vectors), or incompletely (e.g., specifying only the states of a subset of the full set of registers in the design). In this embodiment, if the states are specified incompletely, states that are not specified are derived using a variety of methods, such as those described above, to complete the specification. Alternatively, the user can also specify "exclusion break points" which are directives to the software system specifying portions of the circuit that will not exhibit any switching activity in response to clock signal transitions during the analysis. Thus, these excluded sections of the design are not evaluated for switching.

Furthermore, an interface can be provided to other power analysis tools (e.g., power and timing models, expressed in any one of numerous formats known in the art), or to allow the user to initiate the power analysis. As explained below, placement information can be taken into account in estimating worst-case instantaneous currents. Thus, the present embodiment accepts placement information in any one of numerous formats known in the art (e.g., a DEF file).

In one embodiment of the present invention, an "event log" of the events that are predicted to occur during a cycle of the clock is provided as output. In that embodiment, if multiple clock signals drive the circuit under analysis, the event log is presented relative to the clock signal with the longest period or the clock signal driving the largest capacitive load. The event log lists the instance name, the ALF vector that would be triggered (or the amount of current triggered by that particular ALF vector), and the time at which the trigger would be initiated. (An ALF—Advanced Library Format—vector, which is known to those skilled in the art, expresses dynamic behavior of a logic cell; ALF typically specifies a circuit behavior that can be carried from RTL stage to post-layout stage). This event log can be utilized by other electronic design automation (EDA) tools, such as a waveform displayer to display the current over time, or a voltage-calculating tool to calculate the voltages of each logic cell instance.

In one embodiment, the event log is determined from a static timing analysis. Under one method, the states of sequential elements of the circuit are set according to a pre-determined circuit state and switching or power events in combinational logic elements that respond to the sequential logic elements are selected. From the selected switching events, corresponding current or voltage waveforms in the combinational logic elements are calculated. In one embodiment, the selected switching events are switching events, for example, within a predetermined percentile (80 percentile) among all possible switching events, or those switching events that result in peak currents or voltages exceeding certain pre-determined values. The selection of switching or power events can be achieved by creating an aggregate current or voltage waveform from all the possible switching events, finding the largest current or voltage spike from the aggregate current waveform, selecting from the switching events those switching events that contribute to the largest current or voltage spike, and ranking the contributing switching events in the order of peak currents or voltages. In selecting the pertinent events, mutually exclusive events should not be included in the same selection. In one embodiment, events that are mutually exclusive with the switching event yielding the largest peak current or voltage are eliminated. The analysis can be repeated for the events yielding the second largest peak current or voltage and, subsequently, for events yielding successively lesser peak currents or voltages, until the entire set of switching events have been considered and culled.

In one embodiment, a "SPICE deck" that defines one or more current sources for each logic cell instance is provided as output. (Multiple current sources are defined for each logic cell connected to more than one power supply voltage source). A SPICE deck, as known to those skilled in the art, is an input file in an industry standard format to the circuit simulator "SPICE". In a SPICE deck, each current source can be defined using a piece-wise linear (PWL) model to describe the shape, magnitude, and start and stop times of a current waveform for the current source. The SPICE deck provides an interface to a wide variety of circuit analysis tools.

In another embodiment, the worst-case current waveform for one cycle of the primary clock for each power supply and ground voltage source is generated from the event log and displayed on a graphical display. Alternatively, an ASCII report file listing the worst-case instantaneous peak current value for each power supply and ground reference can be provided.

In one embodiment of the present invention, based on worst-case instantaneous currents estimated from the event log, clock skews can be intentionally introduced into the clocking network to minimize the peak of the current waveform. These clock skews reduce the maximum amount of noise (i.e., improves noise margins) and may improve the overall transient performance of the logic cells experiencing the noise spikes. The clock skewing capability of the present invention is particularly useful when incorporated into an EDA tool having knowledge of timing slack in data paths. Such an EDA tool can provide an appropriate amount of clock skew without introducing timing problems.

The present invention can be used to determine a worst-case instantaneous voltage drop, based on geographic information (e.g., placement information) and the worst-case instantaneous current, since the voltage drop resulting from a given instantaneous current depends on the locations of the sources of the instantaneous currents. In one embodiment, physically proximate registers, such as registers in a given block, can be used as reclassification root points from which other registers can be reclassified.

In another embodiment, a dc analysis of the power network is performed, prior to calculating the instantaneous currents. The dc analysis determines the segments of the power network at which the highest effective resistance with respect to the external chip grounds are located. Once these segments have been identified, reclassification for registers in these segments can be carried out using, for example, the reclassification procedure described above with respect to reclassification phase 603.

The present invention can be used also for designs at the RTL, where the RTL models calculate power due to single edge events, to take timing into consideration, and to use an actual synthesized clock tree, instead of the lumped, symbolic approach typical of existing RTL models. Such enhancements can be implemented in, for example, models expressed in the Structural Functional description Language (SFL), which are known to those skilled in the art.

The above detailed description is provided to illustrate specific embodiments of the present invention and is not intended to be limiting. Numerous modifications and variations within the scope of the present invention are possible. The present invention is set forth in the following claims.

I claim:

1. A method for accurately calculating a current waveform of a circuit having one or more clock networks and multiple register and logic elements, using a circuit description of the circuit, comprising:

performing an analysis of the circuit for each of the clock signals in said circuit, wherein the analysis comprises:
   setting states of sequential elements of the circuit according to a pre-determined circuit state;
   selecting a plurality of switching events in combinational logic elements that respond to the sequential logic elements; and
   calculating waveforms in the combinational logic elements resulting from the selected switching events; and constructing current waveforms based on the switching characteristics of the register and logic elements relative to transitions in the clock networks.

2. A method as in claim 1, wherein the selected switching events are switching events within a predetermined percentile among all possible switching events.

3. A method as in claim 2, wherein the selecting comprises determining the switching events based on a static timing analysis.

4. A method as in claim 3, further comprising
   creating an aggregate current waveform from the set of all switching events;
   finding a largest current spike from the aggregate current waveform;
   selecting from the switching events contributing switching events to the largest current spike; and
   ranking the contributing switching events in the order of peak currents.

5. A method as in claim 3, further comprising
   creating an aggregate voltage waveform from the set of all switching events;
   finding a largest voltage spike from the aggregate current waveform;
   selecting from the switching events contributing switching events to the largest voltage spike; and
   ranking the contributing switching events in the order of peak voltages.

6. The method as in claim 4, further comprising:
   selecting an event, among the contributing switching events, that corresponds to the largest peak current; and
   eliminating from the set of contributing switching events those switching events that are mutually exclusive with the selected event.

7. The method of claim 4, further comprising the method for successively lesser current spikes.

8. The method as in claim 6, further comprising repeating the steps of selecting switching events and calculating waveforms using an event that corresponds to the second largest peak current.

9. The method as in claim 5, further comprising:
   selecting an event, among the contributing switching events, that corresponds to the largest peak voltage; and
   eliminating from the set of contributing switching events those power events that are mutually exclusive with the selected event.

10. The method as in claim 9, further comprising repeating the steps of selecting switching events and calculating waveforms using an event that corresponds to the second largest peak voltage.

11. The method of claim 10, further comprising the method for successively lesser voltage spikes.

* * * * *